Patented Mar. 10, 1931

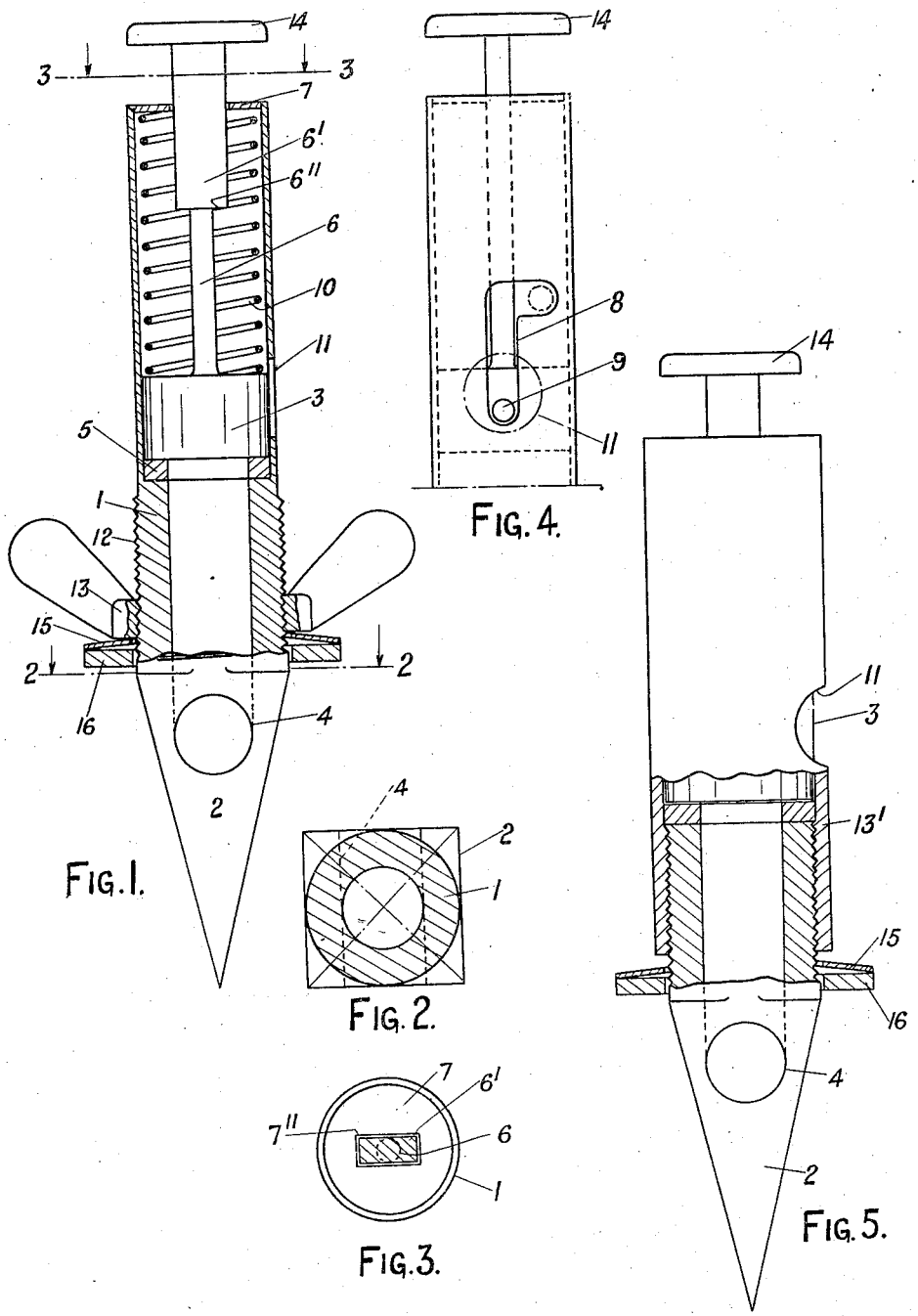
March 10, 1931. A. HOWIE ET AL 1,795,430
DEVICE FOR WITHDRAWING LIQUIDS FROM METALLIC DRUMS, TINS, AND THE LIKE
Filed May 3, 1930
INVENTORS.
A. HOWIE.
J. M. HENRY.
By J.E.M. Fetherstonhaugh
ATTY.

1,795,430

UNITED STATES PATENT OFFICE

ANDREW HOWIE AND JAMES MAGNUS HENRY, OF GLASGOW, SCOTLAND

DEVICE FOR WITHDRAWING LIQUIDS FROM METALLIC DRUMS, TINS, AND THE LIKE

Application filed May 3, 1930, Serial No. 449,450, and in Great Britain May 7, 1929.

This invention has reference to improvements in and relating to devices for withdrawing liquids from metallic drums, tins, and the like and is particularly useful for withdrawing or discharging oil and other liquids from oil drums and other liquid receptacles made of metal capable of being pierced manually by means of a pointed instrument.

A device according to this invention comprises a hollow stem provided with a pointed metal-piercing head of polygonal shape in cross section and an internal shoulder constituting a valve seat, an axially movable valve the end face of which is adapted to co-operate with said valve seat, a discharge outlet formed in the cylindrical wall of said stem and means whereby the said device is secured to the drum. Desirably the valve is provided with a spring and the stem is provided with a screwed member whereby said device may be secured to the drum. The valve may be provided with means whereby it may be held in the open position.

In the accompanying drawings Fig. 1 is an elevation partly in section of a device constructed in accordance with the invention. Figs. 2 and 3 are transverse sections taken respectively on the lines 2—2 and 3—3 of Fig. 1. Figs. 4 and 5 are fragmentary elevations illustrating modifications.

The device or instrument comprises a tubular stem 1 provided with a metal-piercing head 2 and with a manually-operable valve 3. Desirably the piercing head 2 is of square or triangular section which tapers to a sharp point. A hole or passage 4, open to the interior of the stem, extends from side to side through the head 2. A shoulder 5, constituting a valve seat, is provided within the stem 1 and the valve 3 adapted to cooperate therewith is slidably located within the stem 1 and may be provided with a valve rod 6, 6' which extends out through an end cap or cover 7 secured on the end of the stem 1. The one portion 6' of the valve rod may be of rectangular section and the other portion 6 may be circular in cross section. The opening 7' in the cap 7 is of rectangular formation corresponding to the cross section of the portion 6' of the valve rod. Alternatively and as shown by Fig. 4 a knee-shaped slot 8 may be cut in the wall of the stem 1 and a pin 9 secured to the valve 3 may engage therein. Between the end cover 7 and the valve 3 a spring 10 is arranged. The wall of the stem 1 is formed with a suitably positioned discharge opening 11. The outer surface of the stem 1 adjacent to the head is formed with screw-threads 12 on which a nut 13 is screwed. The projecting end of the valve rod is formed or fitted with a handle 14.

In using this device or instrument to withdraw oil or other liquid from a drum or the like the valve 3 is held on to the valve seat 5 by means of the spring 10. The point of the piercing-head 2 of the instrument is pressed manually through the metal of the drum, either the side or end wall of the drum as desired, until the whole of the head 2 is inside the drum and the nut 13 is outside the drum. The instrument is then turned or partially rotated so that the corners of the head 2 are out of register with the corners of the hole in the wall of the drum formed by the head. The nut 13 is now screwed against the outer surface of the wall of the drum, preferably, a metallic washer 15 and a rubber or other suitable washer 16, constituting packing, being sandwiched between the nut 13 and the wall of the drum to make a liquid tight joint. By pulling the handle 14 of the valve rod against the action of the spring 10 the valve 3 is opened, and by turning the valve and rod so that the shoulder 6'' rests upon the outer surface of the cap 7 the valve may be retained in the open position. In the construction illustrated by Fig. 4 the pin 9 which is at one end of the slot 8 when the valve 3 is closed is moved to the other end of the slot 8 when the valve rod is pulled outwards and turned so that the valve 3 is held open. The valve 3 may be provided with packing so as to prevent leakage of oil into the knee-shaped slot 8 and ensure that all the oil is discharged through the discharge opening in the wall 11 of the stem 1.

According to a modification illustrated by Fig. 5 the stem 1 may be cut short at the termination of the screw-threads 12 and the tightening nut may be constituted by a sleeve 13' which contains the valve 3 and which is screwed on to said threads.

We claim:—

1. A device for withdrawing liquids from metallic containers comprising a hollow stem, a pointed metal-piercing head of polygonal shape in cross section secured at the one end of said stem, an internal shoulder formed in said stem and constituting a valve seat, an axially movable valve having a face adapted to cooperate with said valve seat, means for moving said valve axially, a liquid inlet opening formed in said metal-piercing head, a liquid discharge opening formed in said stem and means whereby the said device is secured to the container.

2. A device for withdrawing liquids from metallic containers comprising a hollow stem, a pointed metal-piercing head of polygonal shape in cross section secured at the one end of said stem, an internal shoulder formed in said stem and constituting a valve seat, an axially movable valve having a face adapted to cooperate with said valve seat, a spring tending to maintain said valve in the closed position, means for moving said valve axially against the force exerted by said spring, a liquid inlet opening formed in said metal-piercing head, a liquid discharge opening formed in said stem and means whereby the said device is secured to the container.

3. A device for withdrawing liquids from metallic containers comprising a hollow stem, a pointed metal-piercing head of polygonal shape in cross section secured at the one end of said stem, an internal shoulder formed in said stem and constituting a valve seat, an axially movable valve having a face adapted to cooperate with said valve seat, means for moving said valve axially, a liquid inlet opening formed in said metal-piercing head, a liquid discharge opening formed in said stem, a screw formed on said stem adjacent to said metal-piercing head, and a nut engaging said thread so as to secure the device to the container.

4. A device for withdrawing liquids from metallic containers comprising a hollow stem, a pointed metal-piercing head of polygonal shape in cross section secured at the one end of said stem, an internal shoulder formed in said stem and constituting a valve seat, an axially movable valve having a face adapted to cooperate with said valve seat, a spring tending to maintain said valve in the closed position, means for moving said valve axially against the force exerted by said spring, means whereby the valve may be held in the open position against the force exerted by the spring, a liquid inlet opening formed in said metal-piercing head, a liquid discharge opening formed in said stem and means whereby the said device is secured to the container.

5. A device for withdrawing liquids from metallic containers comprising a hollow stem, a pointed metal-piercing head of polygonal shape in cross section secured at the one end of said stem, an end wall at the other end of said stem, a valve seat formed in said stem between said head and end wall, an axially movable valve adapted to cooperate with said valve seat, a valve rod extending from said valve through said end wall, a handle at the outer extremity of said rod, a pin and a right angled slot cooperative with said pin to maintain the valve in the open position, a liquid inlet opening in said metal-piercing head, a liquid discharge opening formed in said stem and means whereby the said device is secured to the container.

In testimony whereof we have signed our names to this specification.

ANDREW HOWIE.
JAMES MAGNUS HENRY.